(12) United States Patent
Lott et al.

(10) Patent No.: US 10,363,795 B2
(45) Date of Patent: Jul. 30, 2019

(54) CHILLER-ACCUMULATOR SYSTEM FOR AN ENGINE WITH A FORCED INDUCTION SYSTEM

(71) Applicants: Eric M Lott, Oxford, MI (US); Alfred Piggott, Novi, MI (US)

(72) Inventors: Eric M Lott, Oxford, MI (US); Alfred Piggott, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 373 days.

(21) Appl. No.: 15/417,629

(22) Filed: Jan. 27, 2017

(65) Prior Publication Data

US 2018/0215234 A1    Aug. 2, 2018

(51) Int. Cl.
*F02B 29/04* (2006.01)
*B60H 1/00* (2006.01)
*F02B 37/16* (2006.01)
*B60H 1/32* (2006.01)

(52) U.S. Cl.
CPC ..... *B60H 1/00764* (2013.01); *B60H 1/00271* (2013.01); *B60H 1/00342* (2013.01); *B60H 1/00885* (2013.01); *F02B 29/0462* (2013.01); *F02B 29/0475* (2013.01); *F02B 29/0493* (2013.01); *F02B 37/16* (2013.01); *B60H 1/323* (2013.01); *B60H 2001/00307* (2013.01); *B60H 2001/3266* (2013.01); *B60H 2001/3283* (2013.01); *B60Y 2300/18025* (2013.01); *B60Y 2306/05* (2013.01); *B60Y 2400/435* (2013.01); *Y02T 10/144* (2013.01); *Y02T 10/146* (2013.01)

(58) Field of Classification Search
CPC ...... F02B 29/00; F02B 29/04; F02B 29/0406; F02B 29/0412; F02B 29/0418; F02B 29/0425; F02B 29/0437; F02B 29/0443; F02B 29/0493; F02B 29/0475; F02B 29/0462; F02B 37/16; F02M 31/20; B60H 1/00271; B60H 1/00885
See application file for complete search history.

(56) References Cited

U.S. PATENT DOCUMENTS

| 6,347,618 B1 | 2/2002 | Klem |
| 6,796,134 B1 | 9/2004 | Bucknell et al. |
| 7,779,821 B2 | 8/2010 | Noyama et al. |

(Continued)

*Primary Examiner* — Jacob M Amick
(74) *Attorney, Agent, or Firm* — Ralph E. Smith (57) ABSTRACT

A chiller system includes an intercooler configured to cool compressed charge air received from a turbocharger or a supercharger, a low temperature cooling circuit fluidly coupled to the intercooler, the low temperature cooling circuit circulating a coolant to provide cooling to the intercooler and including a low temperature radiator configured to cool the coolant, a chiller-accumulator loop having a combined chiller-accumulator, a chiller bypass line bypassing the chiller-accumulator, and a charging valve configured to selectively provide coolant to at least one of the chiller-accumulator loop and the chiller bypass line, and an air conditioner circuit circulating a refrigerant and having a primary circuit and a bypass circuit. Refrigerant is selectively supplied to the chiller-accumulator to further cool the coolant in the chiller-accumulator loop after the coolant is cooled by the low temperature radiator, thereby providing increased cooling to the intercooler and the compressed charge air to increase engine performance.

19 Claims, 4 Drawing Sheets

(56) References Cited

U.S. PATENT DOCUMENTS

2003/0015183 A1* 1/2003 Sealy .................. F02B 27/02
                                                    123/563
2007/0000247 A1   1/2007 Perkins
2009/0031999 A1   2/2009 Erickson

* cited by examiner

CHILLER-ACCUMULATOR SYSTEM FOR AN ENGINE WITH A FORCED INDUCTION SYSTEM

FIELD

The present application relates generally to charge air cooling systems for an engine having a forced induction system and, more particularly, to a system and method for secondary charge air cooling of such an engine.

BACKGROUND

Some conventional vehicles include a turbocharger and/or a supercharger, which increase the air or air/fuel mixture density of an engine by increasing the pressure of the intake air stream prior to its entering a cylinder of the engine. Increasing the density of air in the cylinder may be desirable because it provides a method of increasing the power generated by the engine. Since pressure is directly related to heat, as the charger increases the pressure of the intake air stream, it also increases the temperature. Cooling of this charged intake air stream enables an additional increase in its pressure since cooler air can be more densely packed. This additional cooling is typically accomplished through the use of an intercooler.

Some intercoolers may include a secondary cooling feature provided by an additional component such as, for example, a vehicle air conditioning circuit. However, such systems typically continuously draw cooling from the additional component, thereby overworking the system and reducing its performance. Moreover, the additional component will need to be increased in size to support the secondary cooling in addition to its primary operation. Accordingly, while such conventional intercooler cooling systems work for their intended purpose, it is desirable to provide an improved intercooler cooling system with improved control features.

SUMMARY

According to one example aspect of the invention, a chiller system for a vehicle engine having a forced induction arrangement is provided. In one exemplary implementation, the chiller system includes an intercooler configured to cool compressed charge air received from a turbocharger or a supercharger, a low temperature cooling circuit fluidly coupled to the intercooler, the low temperature cooling circuit circulating a coolant to provide cooling to the intercooler and including a low temperature radiator configured to cool the coolant, a chiller-accumulator loop having a combined chiller-accumulator, a chiller bypass line bypassing the chiller-accumulator, and a charging valve configured to selectively provide coolant to at least one of the chiller-accumulator loop and the chiller bypass line, and an air conditioner circuit circulating a refrigerant and having a primary circuit and a bypass circuit. The primary circuit is separate from the low temperature cooling circuit and includes a compressor, a condenser, and an evaporator. The bypass circuit includes a conduit that bypasses the evaporator, and a chiller shut off valve configured to selectively prevent refrigerant from flowing through the bypass circuit. The chiller-accumulator is thermally coupled to the chiller-accumulator loop and the bypass circuit. The chiller shut off valve is configured to be controlled to be selectively opened to provide refrigerant to the chiller-accumulator to further cool the coolant in the chiller-accumulator loop after the coolant is cooled by the low temperature radiator, thereby providing increased cooling to the intercooler and the compressed charge air to increase engine performance.

According to another example aspect of the invention, a method of controlling a vehicle having an engine and a controller in communication with an engine chiller system is provided. In one exemplary implementation, the engine chiller system includes (a) a low temperature cooling circuit thermally coupled to an intercooler that receives compressed charge air from a forced induction system, the low temperature cooling circuit circulating a coolant and including a radiator configured to cool the coolant, a chiller-accumulator loop having a combined chiller-accumulator, a chiller bypass line bypassing the chiller-accumulator, and a charging valve configured to selectively provide coolant to at least one of the chiller-accumulator loop and the chiller bypass line, (b) an air conditioner circuit circulating a refrigerant and having a primary circuit and an evaporator bypass circuit that bypasses an evaporator of the primary circuit, and includes a chiller shut off valve, and (c) the chiller-accumulator thermally coupled to the chiller-accumulator loop and the evaporator bypass circuit. In this exemplary implementation, the method includes receiving a signal indicative of the vehicle being commanded to operate in a drag racing mode or a track racing mode, the drag or track racing mode configuring the engine and associated vehicle systems for optimized power output, opening the chiller shut off valve based on receiving the signal such that refrigerant flows to the evaporator bypass circuit and the chiller-accumulator, and cooling the intercooler with the coolant in the low temperature cooling circuit that has been cooled by (i) air flowing through the low temperature radiator and (ii) the refrigerant flowing through the chiller-accumulator, thereby providing increased cooling to the intercooler and compressed charge air for increased engine performance when the vehicle is in the drag or track racing mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
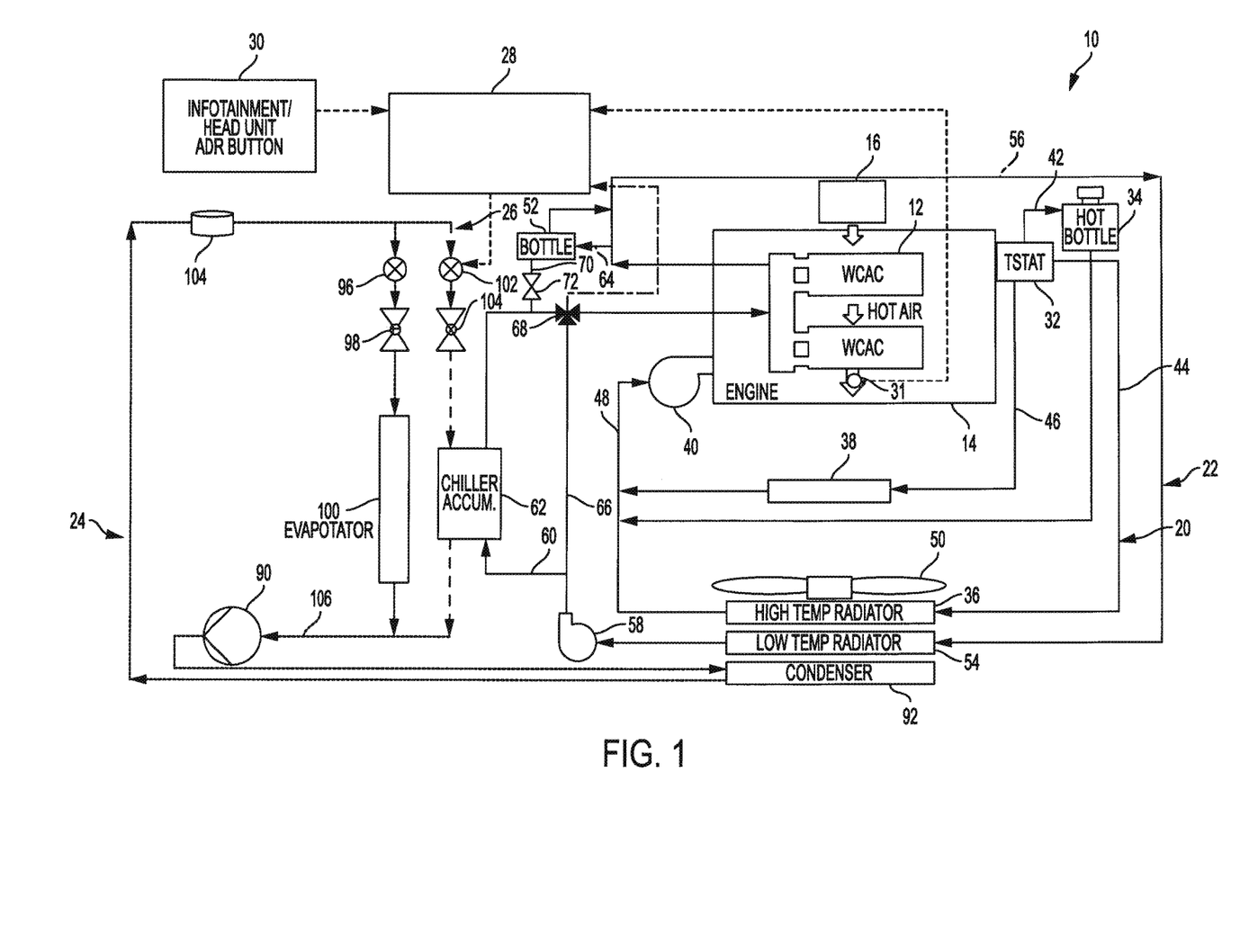
FIG. 1 is a schematic view of an example engine chiller-accumulator system in accordance with the principles of the present disclosure.

With initial reference to FIG. 1, an example vehicle engine chiller-accumulator system for a vehicle engine is
} illustrated and generally identified at reference numeral 10. The engine chiller-accumulator system 10 is configured to provide cooling to an intercooler 12 of a vehicle engine 14 that includes a turbocharger or supercharger 16. The intercooler 12 receives hot compressed air from the charger 16, absorbs heat therefrom, and subsequently supplies cooled, compressed air to an intake and cylinders (not shown) of the engine 14.

In one exemplary implementation, the engine chiller-accumulator system 10 generally includes a high temperature circuit 20, a low temperature circuit 22, and an air conditioning circuit 24 having an evaporator bypass loop 26. In one exemplary implementation, and as will be discussed herein, the circuits 20, 22, 24 are discrete circuits fluidly separate from each other.

The engine chiller-accumulator system 10 is in signal communication with a controller 28 such as an engine control module (ECM), which is in signal communication with a vehicle user interface 30 and an air charge temperature sensor 31. As described herein in more detail, a user, such as a driver, may selectively initiate a "drag racing" or "track racing" driving mode for the vehicle, which activates the evaporator bypass loop 26. This provides increased cooling to intercooler 12, which results in increased engine power and performance. Moreover, separate control strategies for secondary cooling may be utilized for each of the different modes to provide optimal intercooler cooling for that given mode of vehicle operation.

As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In one exemplary implementation, the high temperature circuit 20 circulates a first heat transfer fluid or coolant (e.g., water) and generally includes a thermostat 32, an overflow bottle 34, a high temperature radiator 36, a cabin heat exchanger 38, and a pump 40. The first coolant is heated by engine 14 and is subsequently supplied through thermostat 32 to a first branch conduit 42, a second branch conduit 44, and a third branch conduit 46.

The first branch conduit 42 directs heated coolant to the overflow bottle 34, which is configured to remove air trapped in the circuit 20. The coolant is then directed to a coolant supply line 48. The second branch conduit 44 directs heated coolant to the high temperature radiator 36, where the heated coolant is cooled by ambient air and/or an airflow created by a fan 50. The cooled coolant is then supplied to the coolant supply line 48. The third branch conduit 46 directs the heated coolant to the cabin heat exchanger 38 where thermal energy of the heated coolant is used to provide heating to the vehicle passenger cabin (not shown). The cooled coolant is then directed to the coolant supply line 48.

The pump 40 is disposed within circuit 20 and is configured to circulate the first coolant around the high temperature circuit 20. In the example embodiment, the first coolant may be selectively supplied to branch conduits 42, 44, 46 such that each of the branch conduits may be used alone or in any combination. As such, pump 40 supplies the cooled coolant within supply line 48 to the engine 14 to provide cooling thereto.

In one exemplary implementation, the low temperature circuit 22 is fluidly separate from high temperature circuit 20 and circulates a second heat transfer fluid or coolant such as water. In the illustrated example, the low temperature circuit 22 is dedicated to providing cooling to only the intercooler 12. Low temperature circuit 22 generally includes an overflow bottle 52, a low temperature radiator 54, a pump 58, and a chiller-accumulator loop 60 having a combined chiller (e.g., heat exchanger) and accumulator 62. The second coolant is heated within intercooler 12 against the hot compressed air from charger 16, and is directed to low temperature radiator 54 via a conduit 56. Along the way, at least a portion of the heated coolant may be directed along a loop 64 to the overflow bottle 52, which is configured to remove air trapped in circuit 22.

The heated second coolant is cooled within the low temperature radiator 54 by ambient air and/or ram airflow from fan 50. As used herein, ram airflow is the amount of ambient air forcing through a vehicle grille and heat exchanger from dynamic air pressure created when the vehicle is in motion. Pump 58 is disposed within circuit 22 and is configured to circulate the second coolant around the low temperature circuit 22. As such, pump 58 supplies the cooled coolant from radiator 54 to chiller-accumulator loop 60 or to a chiller bypass line 66.

A valve 68 is disposed along circuit 22 and is configured to selectively supply the second coolant to the chiller-accumulator loop 60, the chiller bypass line 66, or both. Although illustrated as a three-way valve, valve 68 may be any suitable valve that enables system 10 to function as described herein.

System 10 optionally includes a line 70 that branches from chiller-accumulator loop 60 and includes a valve 72 configured to selectively allow a small amount (e.g., a leak) of the second coolant to bottle 52. As such, a small amount of coolant is supplied through the chiller-accumulator 62 during charging, which improves heat transfer in chiller-accumulator 62 by preventing stagnant conditions. In other optional configurations, a pump and recirculating loop (not shown) may be utilized to similarly reduce heat losses in chiller-accumulator 62 and improve heat transfer.

The cooled coolant supplied through chiller-accumulator loop 60 may receive further cooling within the combined chiller-accumulator 62, as described herein in more detail, and is subsequently returned to intercooler 12 for cooling of the charge air. In some operations, combined chiller-accumulator 62 is used as a low temperature reservoir configured to store pre-cooled coolant to provide increased cooling to intercooler 12.

For example, combined chiller-accumulator 62 enables the refrigerant in air conditioning circuit 24 to be brought into indirect thermal contact with the second coolant in low temperature circuit 22. In this way, the second coolant stored in or passing through combined chiller-accumulator 62 is cooled by refrigerant supplied through evaporator bypass loop 26.

Accordingly, cooling for future use may be stored in chiller-accumulator 62 while still supplying a flow of second coolant to intercooler 12 via chiller bypass line 66. The stored chilled second coolant may be subsequently released from chiller-accumulator 62 to provide increased cooling to intercooler 12 during a demand for increased performance (e.g., torque request from a gas pedal, or a hard acceleration during racing). It will be appreciated that the volume and duration of supplied chilled second coolant can be varied depending on chiller-accumulator size, coolant flow rate, charging rate, engine size, and/or various other factors.

In one example, chiller-accumulator 62 has a large enough volume for storing chilled second coolant such that chiller-accumulator can maintain a steady flow chilled second coolant throughout an entire drag race (e.g., 15 second or approximately 15 seconds). In another example, chiller-accumulator 62 holds a liquid volume of between 2.4 L and 3.0 L, or between approximately 2.4 L and approximately 3.0 L. In some examples, chiller-accumulator 62 has a coolant flow rate of 0.46 L/s or approximately 0.46 L/s, and the liquid volume release time for the chiller-accumulator 62 is between 5.2 seconds and 6.5 seconds, or between approximately 5.2 seconds and approximately 6.5 seconds. In another example, chiller accumulator 62 holds a liquid volume of 2.5 L or approximately 2.5 L.

With continued reference to FIG. 1, in one exemplary implementation, air conditioning circuit 24 is a standard vehicle air conditioning system that generally includes a compressor 90, a condenser 92, a receiver/dryer 94, an evaporator shut off valve 96, a first expansion device 98, and an evaporator 100. However, circuit 24 additionally comprises the evaporator bypass loop or circuit 26, which includes a chiller shut off valve 102 and a second expansion device 104. As described herein in more detail, the vehicle and thus system 10 may be selectively switched between a default (normal) driving mode and the drag or track racing mode. As will also be described herein in more detail, the combined chiller-accumulator 62 of the low temperature circuit 22 is thermally coupled to the bypass circuit 26, and the chiller-accumulator 62 to provide indirect heat exchange therebetween.

In the default driving mode, a suction line 106 provides gaseous refrigerant to compressor 90, which subsequently compresses the refrigerant. The compressed and heated refrigerant is directed to the condenser 92 where the heat from compression is dissipated and the refrigerant condenses to a liquid. During normal operation, shut off valve 96 is open and chiller shut off valve 102 is closed. As such, the liquid refrigerant is directed through expansion device 98 (e.g., an expansion valve) where it is reduced in pressure and vaporized, thereby reducing the temperature of the refrigerant. The cooled vapor refrigerant is then supplied to evaporator 100 where it is evaporated to providing cooling to the cabin air. The resulting gaseous, warmed refrigerant is then returned to the compressor 90 via suction line 106 where the cycle is repeated.

In the drag or track racing modes, evaporator shut off valve 96 is closed and chiller shut off valve 102 is open. As such, the liquid refrigerant is directed through expansion device 104 (e.g., expansion valve) where it is reduced in pressure and vaporized, thereby reducing the temperature of the refrigerant. The cooled refrigerant is then supplied to chiller-accumulator 62, which functions as an evaporator and further cools the second coolant in loop 60, thereby providing increased cooling to the coolant therein. Accordingly, in the drag/track racing mode, the refrigerant is not supplied to evaporator 100, which reduces or eliminates cooling of the cabin air. However, in some alternative examples, both of valves 96 and 102 may remain open during operation.

In the example implementation, engine chiller-accumulator system 10 uses ram air cooled low temperature circuit 22 as the primary cooling source for intercooler 12, and only selectively uses evaporator bypass loop 26 and chiller-accumulator 62 as a secondary cooling source for intercooler 12. The chiller-accumulator 62 is disposed downstream of low temperature radiator 54 and will only add refrigerant cooling to circuit 22 when air charge temperature cooling is required and/or the driver has selected a drive mode that supports active chiller-accumulator operation (i.e., drag or track racing mode). As such, chiller-accumulator 62 may be selectively used as a secondary cooling source for intercooler 12, which avoids AC compressor overload and the need for a larger heat exchanger by disabling interior cabin cooling and only using the secondary refrigerant cooling when in the drag/track racing mode.

In this way, engine chiller-accumulator system 10 is thus more practical for implementation than known systems because a vast majority of daily driving of the vehicle will only require the use of the ram air cooling low temperature circuit 22, and the evaporator bypass loop 26 will be closed. This provides increased cabin comfort and acceptable street engine power performance while not requiring increasing the capacity of the NC compressor 90.

However, when the driver prioritizes engine performance over cabin AC performance (i.e., during drag/track racing), the driver can select the drag or track racing mode via the vehicle user interface 30. This selection transitions the vehicle from the default driving mode to the drag or track racing mode. Accordingly, engine chiller-accumulator system 10 enables the driver to selectively choose between optimum driver cooling comfort and increased engine performance, while maintaining current AC component sizing and without negatively affecting vehicle weight or fuel economy that would be required to optimize both simultaneously. Thus, system 10 is especially useful for track or track car applications where the driver can select the priority for available cooling. For example, injection of cold coolant at the start of a drag race will significantly improve engine performance, or available cold coolant can be utilized during a track race to improve acceleration. Moreover, the chilled coolant used during acceleration can be replenished quickly by storing a new volume of coolant in the chiller-accumulator 62 and subsequently cooling the new volume via the evaporator bypass loop 26. System 10 may also be used for high boost engines with high charge air heat loads.

In operation, engine chiller-accumulator system 10 by default operates in a first or normal mode where chiller shut off valve 102 is closed and refrigerant is directed through open valve 96 and then evaporator 100 to provide cooling to the vehicle cabin. When the driver desires increased engine performance, the driver manually selects a drag racing (second) mode, or a track racing (third) mode. For example, the driver may select a track racing mode icon displayed on the user interface 30, provide a voice command to the vehicle, or select a track racing switch/button on the instrument panel, steering wheel, etc.

Once controller 28 receives a signal that the driver has selected one of the drag or track racing modes, the controller 28 automatically closes or commands closure of evaporator shut off valve 96 and opens chiller shut off valve 102. Accordingly, air conditioning circuit 24 directs refrigerant through bypass loop 26 and chiller-accumulator 62 to provide secondary cooling to the coolant flowing through low temperature circuit 22. Controller 28 also locks out or disables the vehicle HVAC system controls (not shown), thereby preventing cooling of the vehicle cabin. For example, user interface 30 may display a notification generally indicating that track racing mode is active and that cabin cooling is off to enhance intercooler cooling. Additionally, if the driver attempts to control the air conditioning or defroster while the vehicle is in the track racing mode, the user interface 30 may display an additional pop-up notification that air conditioning is unavailable to enhance intercooler cooling.

Further, in some implementations, once the driver has activated the drag/track racing mode, the controller 28 performs one or more of the following steps: (i) transition the vehicle transmission from a normal mode to a drag/track racing mode; (ii) activate the vehicle paddle shifters; (iii) transition the vehicle traction control from a normal mode to a drag/track racing mode; (iv) transition the vehicle suspension from a normal mode to a drag/track racing mode; and (v) transition the vehicle steering system from a normal mode to a drag/track racing mode.

In one exemplary implementation, transitioning the vehicle transmission may include adapting the transmission to shift schedules optimized for the quickest vehicle acceleration from a stationary vehicle (drag mode) or quickest gear transition response time for a vehicle on a track (track mode). Activating the paddle shifters (not shown), which are typically located on or near the steering wheel or rim, enables the driver to manually shift the vehicle transmission.

Transitioning the vehicle traction control may include a traction control system adopting calibrations configured for optimum wheel slip for maximum acceleration while traveling in a straight line (drag mode) or relaxed pitch and yaw thresholds that enable increased driver input while on a track (track mode). Transitioning the vehicle suspension may include a suspension control adopting calibrations configured for optimum fore-aft weight transfer for maximum acceleration (drag mode) or dynamically compensating side-side stiffness for improved road handling while on a track (track mode). Transitioning the vehicle steering system may include steering controls adapting to provide an increased amount of road input to the driver and require an increased amount of driver input for vehicle control.

Figure 2:
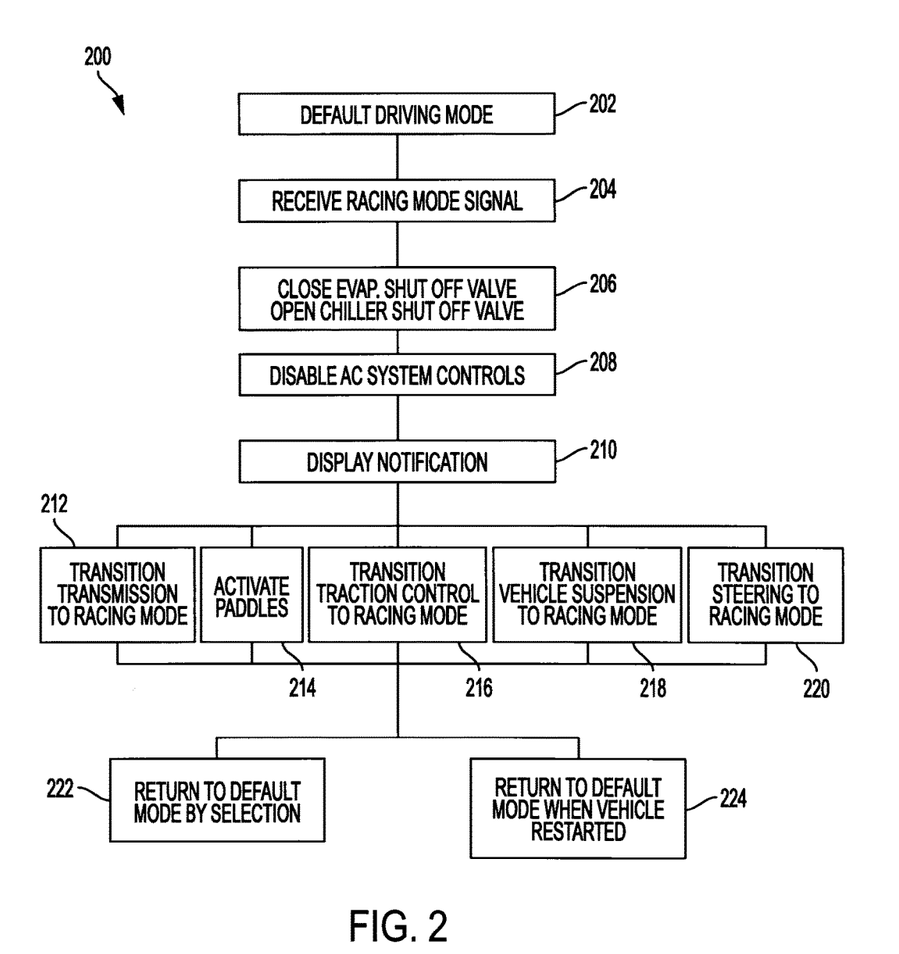
FIG. 2 is a schematic diagram of an example operation of the engine chiller-accumulator system shown in FIG. 1 in accordance with the principles of the present disclosure.

FIG. 2 illustrates a method 200 of controlling a vehicle having a default driving mode, a drag racing driving mode, and a track racing driving mode. The method includes operating the vehicle in the default driving mode at step 202. At step 204, vehicle controller 28 receives a signal indicating that the driver has activated the drag or track racing mode on the user interface 30. At step 206, controller 28 closes evaporator shut off valve 96 and opens chiller shut off valve 102. At step 208, controller 28 disables the vehicle HVAC system controls to prevent utilization of the air conditioning circuit 24 to provide cooling to the vehicle cabin.

At step 210, user interface 30 displays a notification indicating that drag or track racing mode is active and that cabin cooling is off to enhance intercooler cooling. At step 212, controller 28 transitions the vehicle transmission from a normal mode to a drag or track racing mode. At step 214, controller 28 activates the vehicle paddle shifters.

At step 216, controller 28 transitions the vehicle traction control from a normal mode to a track racing mode. At step 218, controller 28 transitions the vehicle suspension from a normal mode to a track racing mode. At step 220, controller 28 transitions the vehicle steering system from a normal mode to a drag or track racing mode.

At step 222, controller 28 returns the vehicle to the default driving mode after receiving a signal indicating that the driver has deactivated the drag/track racing mode or activated the default driving mode on the user interface 30. Alternatively, at step 224, controller 28 returns the vehicle to the default driving mode when the vehicle is restarted.

Additionally, engine chiller-accumulator system 10 is subsequently operated with a particular secondary cooling control strategy based on whether the driver has selected the drag racing mode or the track racing mode. For example, FIG. 3 illustrates one secondary cooling control strategy for drag racing mode, and FIG. 4 illustrates another secondary cooling control strategy for track racing mode.

Figure 3:
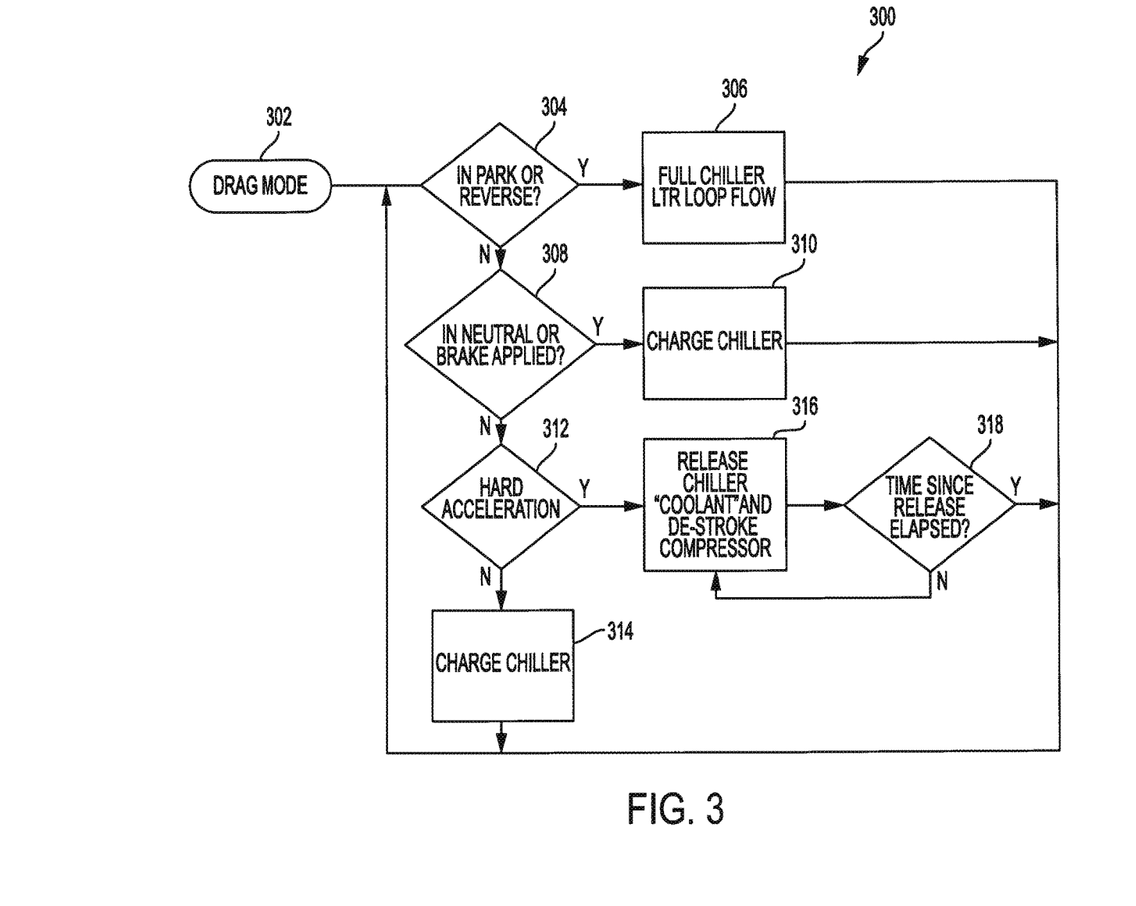
FIG. 3 is a schematic diagram of an example operation of the engine chiller-accumulator system shown in FIG. 1 in accordance with the principles of the present disclosure.
Figure 4:
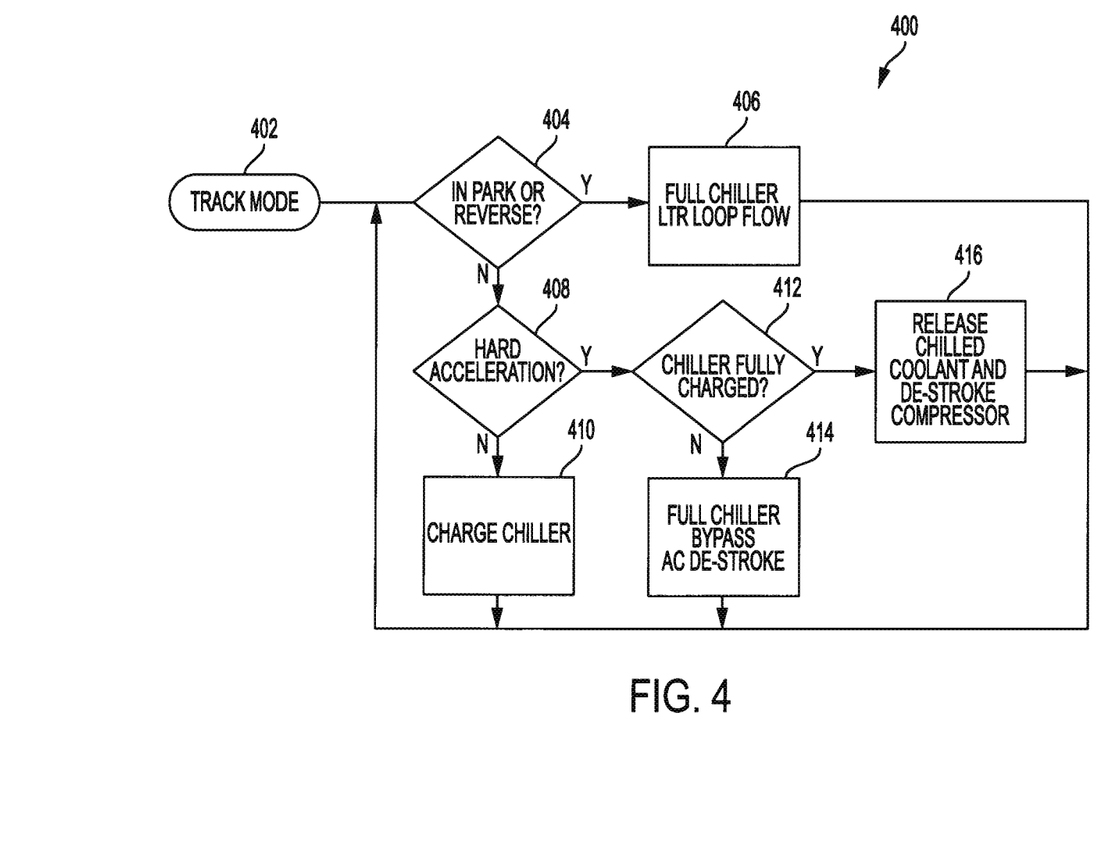
FIG. 4 is a schematic diagram of an example operation of the engine chiller-accumulator system shown in FIG. 1 in accordance with the principles of the present disclosure.

FIG. 3 illustrates an example secondary cooling control strategy 300 when the vehicle is commanded to operate in the drag mode (step 302) and evaporator bypass line 26 is opened and receives refrigerant. At step 304, controller 28 determines if the vehicle transmission is in Park or Reverse. If yes, at step 306, controller 28 commands three-way valve 68 to allow flow through chiller-accumulator loop 60 and prevent flow through chiller bypass line 66. As such, second coolant flows through chiller-accumulator 62 where it is cooled by refrigerant flowing through evaporator bypass line 26, to subsequently provide increased (secondary) cooling to intercooler 12. This is beneficial, for example, when the vehicle is placed in Park or Reverse after a drag race and requires increased cooling. Control then returns to step 304.

If the vehicle transmission is not in Park or Reverse, control proceeds to step 308 where controller 28 determines if the vehicle transmission is in Neutral or if a vehicle brake is applied. If yes, at step 310, controller 28 charges chiller-accumulator 62 by commanding three-way valve 68 to prevent flow through chiller-accumulator loop 60 and allow flow through chiller bypass line 66. In this configuration, a volume of second coolant is stored or is stagnant within chiller-accumulator 62 while cooled second coolant is supplied to intercooler 12 (via bypass line 66). The stored volume of second coolant is subsequently cooled to a predetermined "charged" temperature. For example, the predetermined charged temperature may be determined based on engine temp and/or ambient temp (e.g., 30° C. below ambient temp). This is beneficial, for example, when the vehicle is placed in Neutral or the brake is applied in preparation for a hard acceleration operation (e.g., a drag race) where the vehicle engine will need increased cooling from the stored chilled second coolant. Control then returns to step 304.

If the vehicle transmission is not in Neutral or the brake is not applied, control proceeds to step 312 where controller 28 determines if the vehicle is requesting or performing a hard acceleration (e.g., during a drag race). In one example, the vehicle may display an indicator (e.g., a light) that the chiller is fully charged, and the driver may subsequently request increased cooling for acceleration (e.g., via a button, voice command, or automatically based on control inputs such as steering wheel angle, throttle position, torque request, change in steering wheel angle, change in throttle position, etc.).

If hard acceleration is not requested or detected, at step 314, controller 28 charges chiller-accumulator 62 in a manner similar to that described in step 310.

If hard acceleration is requested or detected, at step 316, controller 28 provides increased cooling to intercooler 12 by releasing the chilled second coolant stored within the volume of chiller-accumulator 62. In particular, controller 28 commands three-way valve 68 to prevent flow through chiller bypass line 66 and enable flow through chiller-accumulator loop 60. The flow through loop 60 subsequently "pushes" the stored chilled coolant out of chiller-accumulator 62 and the chilled coolant is subsequently directed to the intercooler 12. This is beneficial, for example, when the vehicle is operating in a hard acceleration and engine performance is improved by reducing the charge air temperature of air passing through intercooler 12 and ultimately supplied to engine 14.

At step 318, controller 28 determines if a predetermined time has elapsed (e.g., 15 s or approximately 15 s). If no, control returns to step 316. If yes, control returns to step 304.

FIG. 4 illustrates an example secondary cooling control strategy 400 when the vehicle is commanded to operate in the track mode (step 402) and evaporator bypass line 26 is open and receives refrigerant. At step 404, controller 28 determines if the vehicle transmission is in Park or Reverse. If yes, at step 406, controller 28 commands three-way valve 68 to allow flow through chiller-accumulator loop 60 and prevent flow through chiller bypass line 66. As such, second coolant flows through chiller-accumulator 62 where it is cooled by refrigerant flowing through evaporator bypass line 26, to subsequently provide increased (secondary) cooling to intercooler 12. This is beneficial, for example, when the vehicle is placed in Park or Reverse after a track race and requires increased cooling. Control then returns to step 404.

If the vehicle transmission is not in Park or Reverse, control proceeds to step 408 where controller 28 determines if the vehicle is requesting or performing a hard acceleration (e.g., during a track race).

If no, at step 410, controller 28 charges chiller-accumulator 62 by commanding three-way valve 68 to prevent flow through chiller-accumulator loop 60 and allow flow through chiller bypass line 66. In this configuration, a volume of second coolant is stored or is stagnant within chiller-accumulator 62 while cooled second coolant is supplied to intercooler 12 (via bypass line 66). The stored volume of second coolant is subsequently cooled to a predetermined "charged" temperature set automatically or by the driver. This is beneficial, for example, when coasting or decelerating during a track race to store chilled second coolant that can be used during a subsequent hard acceleration where the vehicle engine will need increased cooling from the stored chilled second coolant to improve performance. Control then returns to step 404.

If the vehicle is requesting or performing a hard acceleration, at step 412, controller determines if chiller-accumulator 62 is fully charged (e.g., when the chiller-accumulator internal coolant volume temperature has reached a predetermined or desired temperature.

If the chiller-accumulator 62 is not fully charged, control proceeds to step 414 where controller 28 commands a full chiller bypass and AC de-stroke. Specifically, controller 28 commands three-way valve 68 to prevent flow through chiller-accumulator loop 60 and allow flow through chiller bypass line 66. Controller 28 then mechanically reduces the compressed volume of the compressor 90, thereby reducing the work completed and consumption from engine torque. Thus, to prevent compressor 90 from parasitically draining engine power, compressor 90 is de-stroked when the chiller-accumulator 62 is activated. Control then returns to step 404.

If the chiller-accumulator 62 is fully charged, at step 416, controller 28 provides increased cooling to intercooler 12 by releasing the chilled second coolant stored within the volume of chiller-accumulator 62. In particular, controller 28 commands three-way valve 68 to prevent flow through chiller bypass line 66 and enable flow through chiller-accumulator loop 60. The flow through loop 60 subsequently "pushes" the stored chilled coolant out of chiller-accumulator 62 and the chilled coolant is subsequently directed to the intercooler 12. This is beneficial, for example, when the vehicle is operating in a hard acceleration and engine performance is improved by reducing the charge air temperature passing through intercooler 12 and supplied to engine 14. Control then returns to step 404.

Described herein are system and methods for providing additional cooling to a charger intercooler. An engine chiller system incorporates a three-stage cooling system having a first stage low temperature circuit cooled by vehicle ram air, a second stage where the low temperature circuit is cooled by AC circuit refrigerant, and a third stage where the low temperature circuit is used to cool charge air in the intercooler. The system includes a driver selectable control strategy where the amount of intercooler cooling is modified based upon the vehicle's drive mode configuration (e.g., a default driving mode or a drag/track racing mode). The system uses shut off valves in the AC circuit to selectively provide refrigerant to a chiller in thermal communication with the low temperature circuit.

When in the drag and track modes, the system stores and charges coolant in a chiller-accumulator and subsequently floods the intercooler during hard acceleration to thereby reduce air charge temperature and increase engine performance and power output. In other scenarios, the system provides a steady flow of chilled coolant to the intercooler for an extended period of time (e.g., an entire race). The control strategies and charging strategies differ depending on whether the vehicle is in the drag mode or the track mode.

Accordingly, the system can provide additional, on-demand cooling to the intercooler by utilizing the chiller-accumulator and low temperature circuit. As such, the driver can select various driving modes to prioritize between cabin air conditioner performance and engine power performance, thereby enabling the driver to choose between passenger comfort or engine performance while maintaining current AC component sizing and without negatively affecting vehicle weight or fuel economy.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A chiller system for a vehicle engine having a forced induction arrangement, the chiller system comprising:
    an intercooler configured to cool compressed charge air received from a turbocharger or a supercharger;
    a low temperature cooling circuit fluidly coupled to the intercooler, the low temperature cooling circuit circulating a coolant to provide cooling to the intercooler and including a low temperature radiator configured to cool the coolant, a chiller-accumulator loop having a combined chiller-accumulator, a chiller bypass line bypassing the chiller-accumulator, and a charging valve configured to selectively provide coolant to at least one of the chiller-accumulator loop and the chiller bypass line; and
    an air conditioner circuit circulating a refrigerant and having a primary circuit and a bypass circuit, the primary circuit being separate from the low temperature cooling circuit and including a compressor, a condenser, and an evaporator, the bypass circuit including a conduit that bypasses the evaporator, and a chiller shut off valve configured to selectively prevent refrigerant from flowing through the bypass circuit;
    wherein the chiller-accumulator is thermally coupled to the chiller-accumulator loop and the bypass circuit;
    wherein the chiller shut off valve is configured to be controlled to be selectively opened to provide refrigerant to the chiller-accumulator to further cool the coolant in the chiller-accumulator loop after the coolant is cooled by the low temperature radiator, thereby providing increased cooling to the intercooler and the compressed charge air to increase engine performance.

2. The system of claim 1, wherein in a first mode, the charging valve is configured to be controlled to selectively close the chiller-accumulator loop and prevent flow therethrough such that a volume of the coolant is stored in the chiller-accumulator for further cooling by the refrigerant flowing through the bypass circuit.

3. The system of claim 2, wherein when the charging valve is controlled to prevent flow through the chiller-accumulator loop, the charging valve is configured to be controlled to allow flow through the chiller bypass line to provide a flow of coolant to the intercooler.

4. The system of claim 3, wherein in a second mode, the charging valve is configured to be controlled to prevent flow through the chiller bypass line, and allow flow through the chiller-accumulator loop to provide a flow of cooled coolant to the intercooler.

5. The system of claim 4, wherein the charging valve is a three-way valve.

6. The system of claim 1, further comprising a branch line extending from the chiller-accumulator loop, the branch line including a valve configured to allow a predetermined amount of coolant to flow through the branch line.

7. The system of claim 6, wherein the branch line is fluidly coupled to an overflow bottle, the overflow bottle fluidly connected to the low temperature circuit at a second location downstream of the intercooler and upstream of the low temperature radiator.

8. The system of claim 1, wherein the low temperature cooling circuit splits into the chiller-accumulator loop and the chiller bypass line downstream of the low temperature radiator and upstream of the intercooler.

9. The system of claim 8, wherein the chiller-accumulator loop and the chiller bypass line converge downstream of the split and upstream of the intercooler.

10. The system of claim 1, further comprising a controller in communication with the charging valve;
    wherein upon receipt of a signal indicative of the vehicle being commanded to operate in a drag racing mode, the controller is configured to:
        determine if a vehicle transmission is in park or reverse;
        if the vehicle transmission is in park or reverse, operate the charging valve to allow flow through the chiller-accumulator loop, and prevent flow through the chiller bypass line;
        determine if the vehicle transmission is in neutral or a vehicle brake is applied;
        if the vehicle transmission is in neutral or the vehicle brake is applied, charge the chiller-accumulator by commanding the charging valve to prevent flow through the chiller-accumulator loop, and allow flow through the chiller bypass line, thereby trapping a volume of coolant in the chiller-accumulator for cooling by the refrigerant flowing through the evaporator bypass circuit;
        determine if the vehicle is requesting or performing a hard acceleration;
        if the vehicle is requesting or performing a hard acceleration, release the cooled volume of coolant in the chiller-accumulator and flow the cooled volume of coolant to the intercooler; and
        if the vehicle is not requesting or performing a hard acceleration, charge the chiller-accumulator by commanding the charging valve to prevent flow through the chiller-accumulator loop, and allow flow through the chiller bypass line, thereby trapping a volume of coolant in the chiller-accumulator for cooling by the refrigerant flowing through the evaporator bypass circuit; and
    wherein upon receipt of a signal indicative of the vehicle being commanded to operate in a track racing mode, the controller is configured to:
        determine if the vehicle transmission is in park or reverse;
        if the vehicle transmission is in park or reverse, operate the charging valve to allow flow through the chiller-accumulator loop, and prevent flow through the chiller bypass line;
        determine if the vehicle is requesting or performing a hard acceleration;
        if the vehicle is not requesting or performing a hard acceleration, charge the chiller-accumulator by commanding the charging valve to prevent flow through the chiller-accumulator loop, and allow flow through the chiller bypass line, thereby trapping a volume of coolant in the chiller-accumulator for cooling by the refrigerant flowing through the evaporator bypass circuit;
        if the vehicle is requesting or performing a hard acceleration, determine if the coolant in the chiller-accumulator is fully charged to a predetermined temperature; and
        if the chiller-accumulator is fully charged, release the cooled volume of coolant in the chiller-accumulator and flow the cooled volume of coolant to the intercooler.

11. The system of claim 1, further comprising a controller in communication with the chiller shut off valve, the air conditioner circuit, and a vehicle user interface;
    wherein the controller is configured to control the chiller shut off valve to be opened upon receipt of a signal indicative of the vehicle being commanded to operate in the drag racing mode or the track racing mode, which configures the engine and associated vehicle systems for optimized power output;
    wherein the drag or track racing mode is activated by selecting an icon on the vehicle user interface;
    wherein upon the drag or track racing mode being selected, the controller automatically disables vehicle interior air conditioning system controls and air conditioning of a vehicle cabin interior;
    wherein the air conditioning circuit further includes an evaporator shut off valve in communication with the controller and disposed upstream of the evaporator, the evaporator shut off valve configured to selectively prevent refrigerant from flowing to the evaporator; and
    wherein upon the controller receiving the signal indicative of the vehicle being commanded to operate in the drag or track racing mode, the controller controls the evaporator shut off valve to close and the chiller bypass valve of the bypass circuit to open thereby providing flow of refrigerant from the primary circuit to the chiller-accumulator.

12. A method of controlling a vehicle having an engine and a controller in communication with an engine chiller system, the engine chiller system including:
    (a) a low temperature cooling circuit thermally coupled to an intercooler that receives compressed charge air from a forced induction system, the low temperature cooling circuit circulating a coolant and including a radiator configured to cool the coolant, a chiller-accumulator loop having a combined chiller-accumulator, a chiller bypass line bypassing the chiller-accumulator, and a charging valve configured to selectively provide coolant to at least one of the chiller-accumulator loop and the chiller bypass line;

(b) an air conditioner circuit circulating a refrigerant and having a primary circuit and an evaporator bypass circuit that bypasses an evaporator of the primary circuit, and includes a chiller shut off valve; and (c) the chiller-accumulator thermally coupled to the chiller-accumulator loop and the evaporator bypass circuit, the method comprising:

receiving a signal indicative of the vehicle being commanded to operate in a drag racing mode or a track racing mode, the drag or track racing mode configuring the engine and associated vehicle systems for optimized power output;

opening the chiller shut off valve based on receiving the signal such that refrigerant flows to the evaporator bypass circuit and the chiller-accumulator; and cooling the intercooler with the coolant in the low temperature cooling circuit that has been cooled by (i) air flowing through the low temperature radiator and (ii) the refrigerant flowing through the chiller-accumulator, thereby providing increased cooling to the intercooler and compressed charge air for increased engine performance when the vehicle is in the drag or track racing mode.

13. The method of claim 12, wherein when the vehicle is commanded to operate in the drag or track racing mode, in a first mode:

operating the charging valve to close the chiller-accumulator loop and prevent flow therethrough such that a volume of the coolant is stored in the chiller-accumulator for cooling by the refrigerant flowing through the bypass circuit; and operating the charging valve to open the chiller bypass line to allow flow through the chiller bypass line to provide a flow of coolant to the intercooler.

14. The method of claim 13, wherein when the vehicle is commanded to operate in the drag or track racing mode, in a second mode:

operating the charging valve to close the chiller bypass line and prevent flow therethrough; and operating the charging valve to open the chiller-accumulator loop to release the volume of cooled coolant stored in the chiller-accumulator and supply the volume of cooled coolant to the intercooler.

15. The method of claim 12, wherein when the vehicle is commanded to operate in the drag racing mode:

determining if the vehicle transmission is in park or reverse;

if the vehicle transmission is in park or reverse, operating the charging valve to allow flow through the chiller-accumulator loop, and prevent flow through the chiller bypass line.

16. The method of claim 15, wherein when the vehicle is commanded to operate in the drag racing mode, further comprising:

determining if the vehicle transmission is in neutral or a vehicle brake is applied; and if the vehicle transmission is in neutral or the vehicle brake is applied, charging the chiller-accumulator by commanding the charging valve to prevent flow through the chiller-accumulator loop, and allow flow through the chiller bypass line, thereby trapping a volume of coolant in the chiller-accumulator for cooling by the refrigerant flowing through the evaporator bypass circuit.

17. The method of claim 16, wherein when the vehicle is commanded to operate in the drag racing mode, further comprising:

determining if the vehicle is requesting or performing a hard acceleration;

if the vehicle is requesting or performing a hard acceleration, releasing the cooled volume of coolant in the chiller-accumulator and flowing the cooled volume of coolant to the intercooler; and if the vehicle is not requesting or performing a hard acceleration, charging the chiller-accumulator by commanding the charging valve to prevent flow through the chiller-accumulator loop, and allow flow through the chiller bypass line, thereby trapping a volume of coolant in the chiller-accumulator for cooling by the refrigerant flowing through the evaporator bypass circuit.

18. The method of claim 12, wherein when the vehicle is commanded to operate in the track racing mode:

determining if the vehicle transmission is in park or reverse; and if the vehicle transmission is in park or reverse, operating the charging valve to allow flow through the chiller-accumulator loop, and prevent flow through the chiller bypass line.

19. The method of claim 18, wherein when the vehicle is commanded to operate in the track racing mode, further comprising:

determining if the vehicle is requesting or performing a hard acceleration;

if the vehicle is not requesting or performing a hard acceleration, charging the chiller-accumulator by commanding the charging valve to prevent flow through the chiller-accumulator loop, and allow flow through the chiller bypass line, thereby trapping a volume of coolant in the chiller-accumulator for cooling by the refrigerant flowing through the evaporator bypass circuit;

if the vehicle is requesting or performing a hard acceleration, determining if the coolant in the chiller-accumulator is fully charged to a predetermined temperature; and if the chiller-accumulator is fully charged, releasing the cooled volume of coolant in the chiller-accumulator and flowing the cooled volume of coolant to the intercooler.

* * * * *